(No Model.)
J. J. SCHILLINGER.
UNDERGROUND CONDUIT FOR ELECTRIC WIRES.
No. 337,624. Patented Mar. 9, 1886.
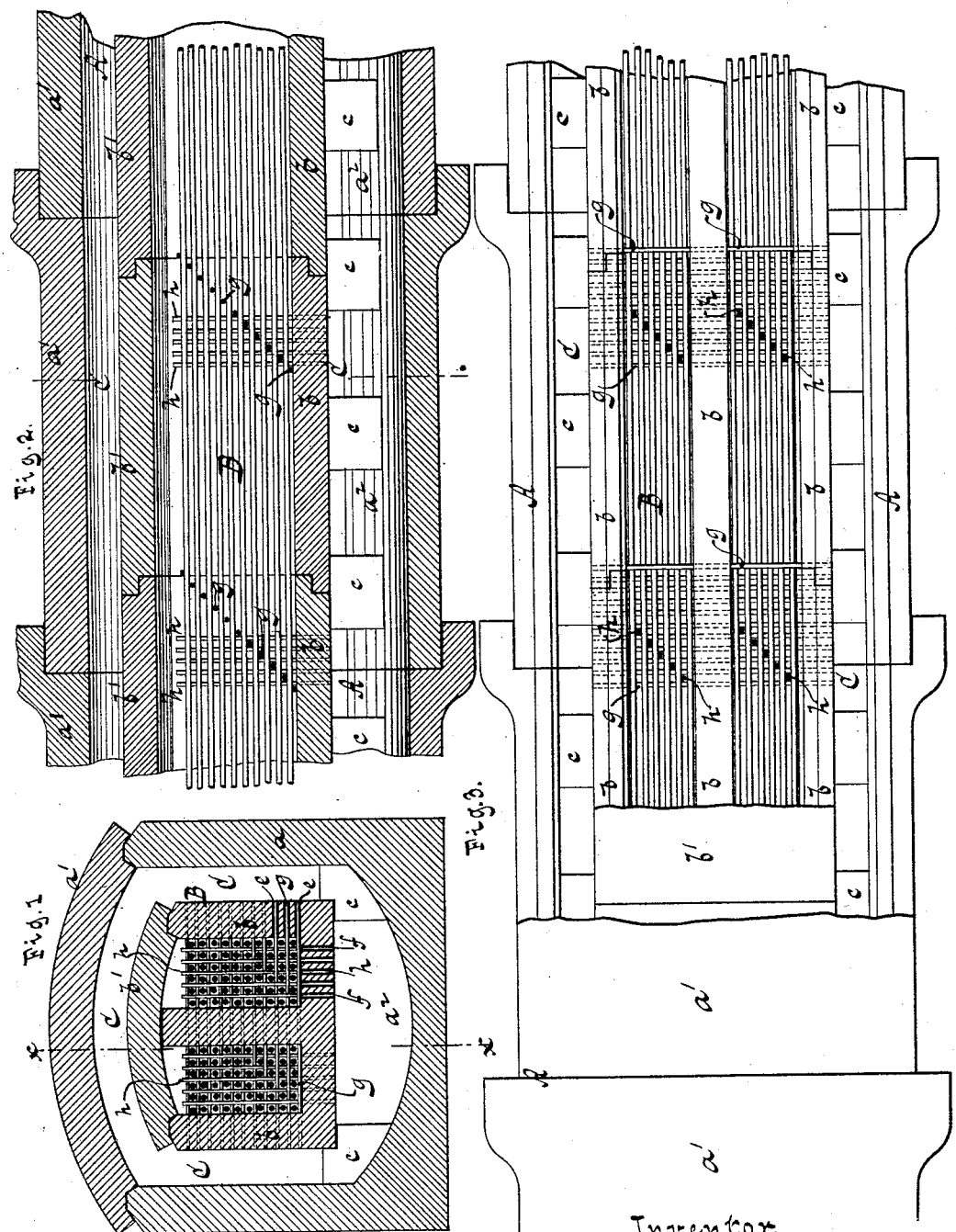

UNITED STATES PATENT OFFICE.

JOHN J. SCHILLINGER, OF NEW YORK, N. Y.

UNDERGROUND CONDUIT FOR ELECTRIC WIRES.

SPECIFICATION forming part of Letters Patent No. 337,624, dated March 9, 1886.

Application filed October 29, 1885. Serial No. 181,302. (No model.)

*To all whom it may concern:*

Be it known that I, JOHN J. SCHILLINGER, a citizen of the United States, residing at New York, in the county and State of New York, have invented new and useful Improvements in Underground Conduits for Electric Wires, of which the following is a specification.

This invention relates to an underground conduit; and it consists in the construction and combination of devices hereinafter described and claimed, reference being made to the accompanying drawings, illustrating my invention, in which—

Figure 1 represents a transverse section. Fig. 2 is a longitudinal vertical section in the plane $x\ x$, Fig. 1. Fig. 3 is a plan view of the same with the covers removed.

Similar letters indicate corresponding parts.

In the drawings the letter A designates the exterior trough of my underground conduit. This trough is, by preference, made of hydraulic cement; or it can be made of any other material which will give sufficient strength and is capable of excluding moisture. It is made of a series of sections, which are joined together by flanges or otherwise, as shown in Figs. 2 and 3. Each section consists of a body, $a$, and a cover, $a'$, which rests upon the body, as shown in Fig. 1, and which can be removed, if it is desired to obtain access to the interior of the conduit.

In the bottom of the body $a$ is formed a semicircular channel, $a^2$, which serves as a sewer to carry off any fluid which may form in or be conducted into the conduit.

The letter B designates the interior trough. This trough may also be made of hydraulic cement; but when the conduit is to be used for underground electric wires I make it, by preference, of asphaltum compound, or of any other composition of a similar nature which will effectually exclude moisture. This interior trough is also made in sections similar to the sections of the exterior trough, and it is placed into the exterior trough, A, in such a manner that it is surrounded by an air-space, C. In the example shown in the drawings it is supported by brackets $c$, formed on or secured to the inner sides of the exterior trough; but said interior trough might be supported on legs or supports bearing upon or rising from the bottom of the exterior trough without departing from the spirit of my invention. By the air-spaces C a circulation of air takes place all round the interior trough, and the inner space of this trough remains perfectly dry. Each section of the interior trough consists of the body $b$ and the cover $b'$, and this cover is made convex, so that any liquid which may result from the condensation of moisture contained in the air in air-space C will run down into the semicircular channel $a^2$ of the exterior trough.

The inner space of the interior trough may be divided into two or more compartments, so that if the conduit is to be used for underground electric wires one compartment can be used for telephone-wires, another for electric-light wires, and another for telegraph-wires; or, in other words, that the wires can be kept separate, as may be desirable.

When the conduit is to be used for underground wires, I provide the sides and the bottom of the interior trough, B, with a large number of holes, $e\ f$, to receive a series of pegs, $g\ h$, which serve to keep the wires separate from each other. These pegs are made of wood, or other bad conductor of electricity, and they are inserted as indicated in the drawings—that is to say, first a horizontal peg, $g$, then behind this a vertical peg, $h$, then again a horizontal peg behind the vertical peg, and so on—and when all the wires have been inserted the trough is filled with paraffine, which is poured in in a melted state, and which, when set, serves to retain the wires in position and to protect the same against the influence of moisture.

What I claim as new, and desire to secure by Letters Patent, is—

An electric-wire conduit composed of the exterior trough, A, having cover $a'$ and semicircular bottom wall, $a^2$, the interior trough, B, supported within the outer trough to form a continuous intermediate air-space on all sides, said interior trough being provided with a cover, $b'$, and having a continuous series of transverse perforations, $e\ e$, in its side walls and vertical perforations $f\ f$ in its bottom wall, and the horizontal and vertical pegs $g\ h$, supported in said perforations respectively, substantially as described.

In testimony whereof I have hereunto set my hand and seal in the presence of two subscribing witnesses.

JOHN J. SCHILLINGER. [L. S.]

Witnesses:
W. HAUFF,
E. F. KASTENHUBER,